July 23, 1935.  T. H. HENKLE  2,008,981
RESILIENT WHEEL
Filed Dec. 15, 1933
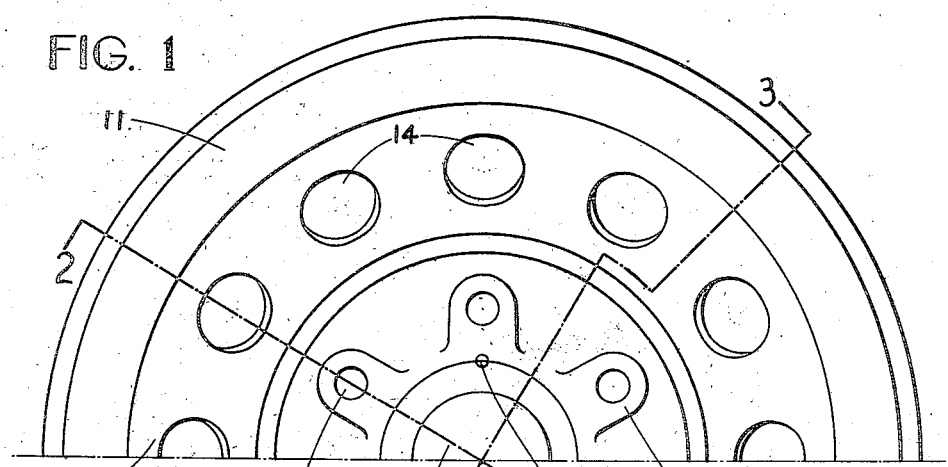
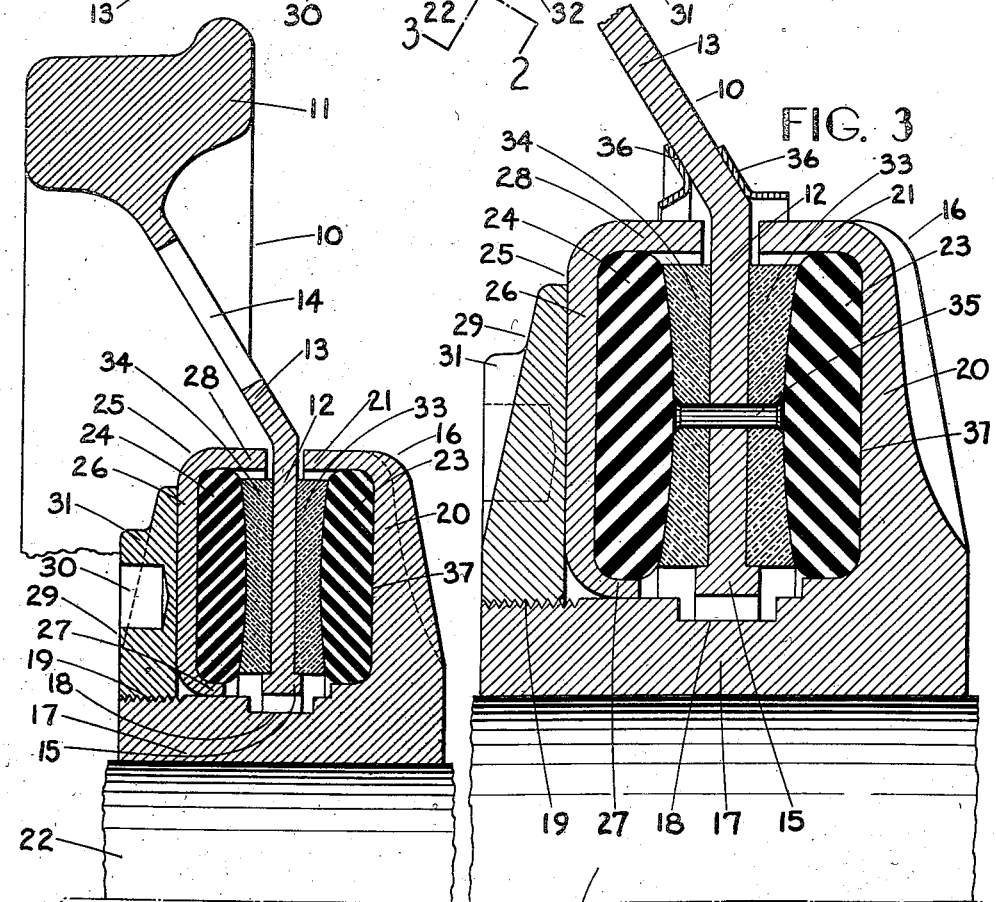
INVENTOR
THOMAS H. HENKLE
BY Parker & Burton
ATTORNEYS Patented July 23, 1935

2,008,981

UNITED STATES PATENT OFFICE 2,008,981

RESILIENT WHEEL

Thomas H. Henkle, Detroit, Mich.

Application December 15, 1933, Serial No. 702,465

5 Claims. (Cl. 295—11)

My invention relates to the art of wheels and particularly to resilient wheels for use on rails. Some of the chief objections to railway vehicles have related to the noise of their operation and their hard-riding qualities, due chiefly to the widespread use of solid metal wheels. Some considerable efforts have been made recently to correct these objectionable features, and, as a result, many types of pneumatic-tired and cushioned wheels have appeared. A great many of these developments are so designed as to necessitate radical changes in car under-structure design to allow for changes in braking, thus making it impractical and sometimes impossible to replace the present solid metal wheels with the newer types.

With these thoughts in mind, I have devised the novel wheel structure hereinafter set forth. My main object has been to provide a resilient wheel which would be characterized by its noise-deadening and shock-absorbing qualities. An ancillary object relates to the insulation of the various wheel parts from the deleterious effects of heat. Further objects relate to the provision of a wheel to replace the present solid metal wheels without necessitating any material change in equipment or design. Wheels of my improved type are adapted to replace the present metal wheels in use on street cars and railway cars, and to utilize the type of braking now in service. Additional objects relate to the cheapness of manufacture and maintenance, as well as the ease of repair, when necessary, of these wheels.

With these and other objects in view, the invention resides in the novel features incorporated in the construction and arrangement of parts as more fully hereinafter set forth.

In the drawing:

Figure 1 is an elevation view of the outer face of my improved wheel, showing one-half the wheel.

Figure 2 is a cross-sectional view taken on line 2—2 in Figure 1, and illustrating the section through the portion of the wheel indicated.

Figure 3 is a cross-sectional view taken on line 3—3 in Figure 1, illustrating a different section of the wheel.

Referring to the drawing by reference numerals, wheel body 10 comprises an annular rim portion 11, adapted to run on rails, and a web portion 12 extending inwardly from the rim portion. Web 12 is integral with rim 11 and may have a conical intermediate section 13, having spoke holes 14, as shown. Web 12 is preferably flanged at its inner periphery as at 15.

The numeral 16 in Figure 2 indicates generally a hub, comprising an axially-extending body portion 17, having an annular groove or recess 18 and a threaded end portion 19. At the inner axial end of hub 16 is provided a ribbed radially extending flange 20, terminating in an axially outwardly extending flange 21. Hub 16, as illustrated, is adapted to be pressed on axle 22 in a manner similar to that in which present solid metal wheels are mounted on car axles.

In a preferred form of my invention, wheel body 10 is resiliently supported with respect to hub 16 by a pair of annular resilient members disposed on either side of web 12. These members are preferably of rubber of a suitable degree of hardness. The axially inner member 23 lies within an annular pocket formed by the body portion 17 and flanges 20 and 21 of hub 16 and may be identical in form and interchangeable with the axially outer member 24 on the opposite side of the wheel body 10 and lying within a pocket of clamping ring 25, comprising an annular body portion 26 and axially inwardly extending flanges 27 and 28. Flange 28, at the outer periphery of ring 25 extends axially towards flange 21 of hub 16.

The web 12 of the wheel body 10 passes radially between the edges of flanges 28 and 21 but is normally held out of contact therewith by resilient members 23 and 24, which are held under a high degree of axial compression by means of an annular plate 29 threaded onto the end 19 of hub 16 and adapted to force clamping ring 25 axially toward flange 20 of the hub, the inner flange 27 being piloted on the hub body 17.

Plate 29 may be provided with an annular series of equally spaced holes 30, drilled in embossed portions 31. Holes 30 are arranged in diametrically opposite series, and are adapted to receive a spanner wrench which may be used to advantage in screwing and unscrewing plate 29 from hub 16 and which may be used in conjunction with different pairs of holes 30 in order that various angular positions may be attained. Plate 29 may be locked in any position of threaded engagement with the hub by any of the well-known methods, one of which is illustrated in Figure 1 and employs a set-screw 32, threaded into the two members adjacent the pitch line of the threaded portion 19 on the hub.

Web portion 12 of wheel body 10 is separated on both sides from the resilient members 23 and 24 by heat-resisting members 33 and 34, which are preferably formed of molded asbestos or other heat-insulating or resisting materials and which may be secured, if desired, by an annular series of rivets 35, and piloted on flange 15. The radial cross section of the outer faces of these heat-resisting members 33 and 34, is substantially concave to fit the contour of the resilient members 23 and 24, and to assist materially in maintaining the wheel body 10 in a true concentric position with respect to the hub.

Annular splash guards 36 may be provided to prevent the access of oil, water, or other foreign matter to the resilient and heat-resisting members, and avoiding the deleterious effects usually accompanying such access. Electrical contact between the wheel body 10 and hub 16 may also be provided for by means of a flexible metal cable attached to these two members, in order that electrical currents may be picked up or discharged from the wheel rim in the normal operation of block-signals, switches and other electrical apparatus now used on railroad and other track systems.

The advantages of the structure set forth and illustrated are manifested in every phase, in the manufacture, installation, operation, and maintenance of these wheels.

Treating first of manufacture, it will be observed that this step is simple and the cost thereof is low, little labor being required. The wheel body 10 may be a simple steel casting, which probably need not be machined other than on the track-contacting portions of rim 11, and on the inner periphery. The hub 16 may be a forging or casting and requires very little machining except for cutting the threads at 19, the groove at 18, and rough machining the edge of flange 21 and body portion 17. The inside face 37 of the hub flange 20 is preferably roughened or serrated in order that the resilient member 23 may be held more securely with respect to the hub. Clamping ring 25 may be a simple stamping and requires little or no machining, except possibly at the inner periphery. The inner face of this ring is preferably roughened or serrated like face 37 of the hub, in order that resilient member 24 may be more firmly held in position with respect to the hub. Plate 29 may be a simple forging or casting requiring only rough machining on the face adjacent ring 25, and a simple tapping step on the inner periphery.

The installation or assembly step offers additional advantages. Hub 16 is pressed on axle 22 in the usual manner. The various members of the wheel assembly have been so designed that they are adapted to be telescoped over the threaded end of the hub regardless of whether or not the hub is on the axle. The order of assembly is obvious, inasmuch as the members are arranged in axially abutting relationship. The inner resilient member 23 is first in order and is piloted into place by the hub flanges and hub body. This member 23 is obviously not under axial compression during this stage of the assembly, and it accordingly tends to hold the wheel body 10 and heat-resisting members 33 and 34 in a position axially outward of groove 18, so that the inner peripheral flange 15 of web 12 is piloted on the body 17 of the hub, and in perfect concentric alignment therewith.

This concentric alignment is maintained while the outer resilient member 24, the clamping ring 25, and plate 29 are partially assembled, in the order mentioned. As plate 29 is advanced on the threads of the hub with the aid of a spanner wrench, or other suitable tool, resilient members 23 and 24 are compressed axially, until the inner peripheral flange 15 of wheel web 12 leaves the body portion of the hub, moving axially to a position adjacent groove 18, in which position it is supported free of the hub, and spaced radially from the bottom of the groove. The desired position of the wheel body with respect to the hub may be ascertained by gauging the width of the gaps between web 12 of the wheel body and the edges of flanges 21 and 28 on the hub and clamping ring, respectively. It will be noted that groove 18 in the hub is considerably wider than flange 15 of the wheel web 12, to allow ample clearance and a wide range of adjustment between the members. During the positioning of the various wheel parts, the concave faces of the heat-resisting members abutting the resilient members tend to further assure the ultimate concentric position of the wheel body.

Thus it will be seen that the self-centering actions of the various wheel parts permit the wheel to be assembled on the hub without necessitating removal of the hub from the axle. This feature allows for the adjustment, repair, and replacement of wearing parts, and eliminates the onerous and costly task of pressing the hub off the axle and repressing it. The wide range of angularity afforded by the different sets of holes 30 in plate 29 allows a spanner wrench to be used in a number of positions, which feature is highly desirable when work is being done in close quarters as, for instance, under a car.

While the advantages afforded in the manufacture and assembly of the wheel are great, my greatest claim to advantage lies in the operation of the wheel. In the first place, the wheel is practically non-resonant, inasmuch as noise travelling inwardly along the wheel web from the rim is isolated from the hub and axle by the resilient members which, in conjunction with the heat-resisting members, form the sole connection between the wheel and the hub. Secondly, heat, which may be generated by friction and by repeated braking efforts applied on the rim of the wheel, is partially dissipated through the conical section 13 of the wheel body and the ventilating holes 14 therein. Whatever remaining heat reaches the web portion 12 is isolated from the resilient members 23 and 24 by the heat-resisting members 33 and 34, respectively.

In case rivets 35 are used, they may be countersunk as shown so that the head portions do not touch the resilient members. Heat has an admittedly deleterious effect on rubber or other resilient material and my invention obviates this effect in the manner described. It will further be noted that the radial flange 20 of the hub is radially ribbed, so as to efficiently dissipate heat which may be generated in the hub or axle. In addition, the gaps between wheel web 12 and flanges 21 and 28 allow a circulation of air within the enclosed portion, while splash guards 36 prevent the access of oil, water, or other foreign matter thereto.

Obviously, the wheel has resilient characteristics which materially improve the riding qualities of any car on which this type of wheel may be used. In this connection, it will be seen that the wheel body floats, in the true sense of the word, inasmuch as there is no metal-to-metal contact between the wheel body and the hub. Both radial and angular movements are permitted to a degree sufficient to absorb shocks imposed on the rim, but not sufficient to materially displace the wheel from its concentric position with respect to the hub. The axially extending flanges 21 and 28 serve to positively limit the amount of axial or angular travel of the wheel body which may be occasioned by lateral thrusts thereon.

A further valuable feature of my invention is manifested in the high degree of axial compression which may be obtained in the resilient members by means of plate 29 threaded on the hub. This axial compression is truly adjustable or variable to meet lighter or heavier wheel load requirements, as the case may be. Also, the wheel parts and the hub are so arranged that they may be re-designed to enlarge or reduce their sizes in proportion to wheel loads.

In operation, the resilient members on either side of the wheel body are in true shear, both radially and rotatively, thus insuring high performance advantages and long service life of these members. The roughened inner surfaces of the hub flange 20 and the clamping ring at 26 also serve to hold the resilient members more securely in position with respect to the hub.

While I have illustrated but one specific embodiment of my invention and a slight modification thereof, still others will be obvious to those skilled in the art, and I do not therefore wish to be limited to the exact form of the invention disclosed, but intend that the attached claims, as read and interpreted in the true generic spirit of my invention, shall cover all its embodiments.

What I claim is:

1. A wheel comprising, in combination, a wheel body, a hub having a grooved portion thereon, a resilient member, and a heat-resisting member, said resilient member and said heat-resisting member being interposed between said wheel body and said hub so as to laterally support said wheel body on opposite sides thereof in such a position that the inner diametral edge thereof is substantially concentrically spaced from the grooved portion of said hub.

2. A wheel comprising, in combination, a wheel body, a hub, a heat-resisting member adjacent said wheel body, a resilient member between said heat-resisting member and said hub, and resilient means for forcing said heat-resisting member against said resilient member to support said wheel body out of contact with said hub, said heat-resisting member being so shaped as to center said wheel body with respect to said hub.

3. A wheel assembly, including a wheel body, resilient members on either side of said wheel body for supporting the latter, and heat-resisting means between said resilient members and said wheel body for preventing the transmission of heat therebetween, said heat-resisting means being adapted to center said wheel body with respect to said resilient members.

4. A wheel comprising, in combination, a wheel body, a hub, a resilient body adjacent said hub, and a heat-resisting member interposed between said wheel body and said resilient body, said heat-resisting member having a substantially concave surface adjacent said resilient body adapted to center said wheel body with respect to said hub.

5. A wheel assembly, including a hub, a groove in said hub, a wheel body, a clamping ring, resilient members adjacent said clamping ring and said hub, and heat-resisting members between said wheel body and said resilient members, the inner periphery of said wheel body being adapted to be piloted on said hub, said wheel body thus serving to pilot said resilient members, said heat-resisting members, and said clamping ring concentrically on said hub during the assembly of said wheel parts, said wheel body being positioned adjacent said groove in said hub when the assembly is completed.

THOMAS H. HENKLE.